No. 685,101.  
P. CHAPUY.  
ELECTRIC BATTERY.  
(Application filed Feb. 21, 1901.)  
Patented Oct. 22, 1901.

(No Model.)

Witnesses.  
Inventor.  
Paul Chapuy.  
By James L. Norris.  
Att'y.

UNITED STATES PATENT OFFICE.

PAUL CHAPUY, OF VINCENNES, FRANCE.

ELECTRIC BATTERY.

SPECIFICATION forming part of Letters Patent No. 685,101, dated October 22, 1901.

Application filed February 21, 1901. Serial No. 48,334. (No model.)

*To all whom it may concern:*

Be it known that I, PAUL CHAPUY, engineer, a citizen of the French Republic, residing at Vincennes, department of Seine, France, (and having post-office address 9 Rue de Bagnolet, in the said city,) have invented certain new and useful Improvements in Electric Batteries, of which the following is a specification.

This invention relates to electric batteries; and the objects and advantages thereof will be set forth in the accompanying specification, while its novel features will be covered in the claims forming a part of the same.

Figure 1:
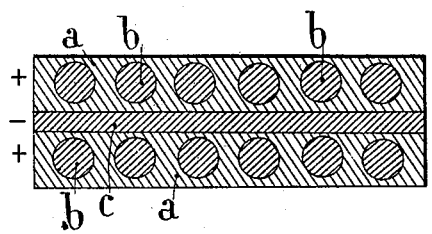
Figure 2:
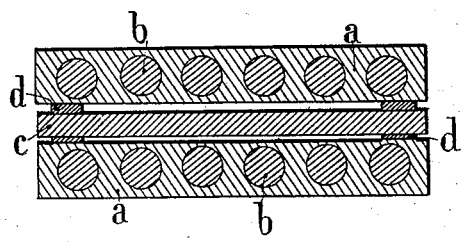

In the drawings, Figures 1 and 2 are cross-sectional views of battery elements, Fig. 2 being a slight modification of the form shown by the other.

Like characters refer to like parts in both figures.

$a$ represents blocks of material capable of resisting the action of the electrolyte and having large pores and provided with cavities for the reception of the positive electrodes $b$, which may be of any preferred kind. The blocks $a$ may be rectangular, as shown, and as it is presumed that the active material is liable to swell each positive electrode is inclosed in a special block $a$ in order to prevent disaggregation.

The positive electrodes $b$ are of cylindrical form, and they are embedded in the blocks or cases $a$, while the negative electrodes $c$ are situated between the blocks or cases $a$, and said electrodes may be made of any suitable material. In Fig. 1 the negative electrode is in contact with the inner faces of the blocks or cases $a$, while in Fig. 2 it is shown as being out of engagement, such relation being secured by spacing pieces or strips $d$; but in both cases the positive electrodes are arranged in parallel rows of cylinders, while the negative electrodes are arranged between the blocks in which said positive electrodes are embedded. The pores in the blocks $a$ must communicate with each other and present a sectional area sufficiently large to facilitate the escape of the gases and allow the free circulation of the electrolyte, as otherwise in consequence of the chemical actions which the electrolyte undergoes under the action of the current great differences in the specific gravity of its various layers would exist. A suitable material for the said blocks $a$ is made by taking divided ceramic substance mixed with a granular material capable of being volatilized or burned, so as to leave in the ceramic material pores of a size corresponding to that of the articles of the said granular material, the size of which particles must therefore be suitably chosen. As ceramic substance I use, preferably, a mixture of pure clay or kaolin and of a flux, and as the said granular material I may use divided coal carefully sifted to the required size and free from impurities or ashes capable of forming with the paste enamel which would be impervious or block up the pores. The ingredients are crushed and mixed in a mill, and sufficient water is added to form a consistent paste, which is molded into the requisite forms and dried, the drying being completed in a drying-stove. The blocks are then baked at a temperature exceeding 1,200° centigrade, which may be done on a kiln similar to the kilns used for baking porcelain.

The cavities for the reception of the electrodes may be formed in the blocks while they are being made or after they are made.

While a battery constructed in accordance with my invention is being charged or discharged it may happen that particles of lead peroxid are entrained by the gases which are evolved. These particles would be deposited in the pores of the blocks and form continuous deposits capable of electrically connecting opposite electrodes, thus giving rise to slow internal discharge or to short-circuiting. In order to obviate this, I may insert between two electrode-retaining blocks or between such blocks and the opposite electrodes strips $d$, of insulating material—such, for example, as ebonite, as shown in Fig. 2—so that a small free space is left between. This free space may, however, be provided by otherwise fixing the blocks or blocks and electrodes so that a certain amount of space or play is left between them. This arrangement prevents the formation of any continuous conducting deposit of the entrained particles, and if any should be detached from the block or electrode it will fall to the bottom of the cell through the said small free spaces. A small space may be provided below the electrodes sufficient to prevent the formation of a short circuit. When there is no ground to fear that continuous deposits will be formed between the electrodes, the blocks may be replaced by a filling mass prepared by grinding to powder the hereinbefore-described ceramic mass or simply by putting back the powder that drops from the blocks in the course of their manufacture.

My invention can be applied either to storage batteries or to primary batteries.

Having described the invention, I claim—

1. In a battery, a plurality of porous nonconducting blocks, electrodes embedded in said blocks and consisting of rows of separate parts and an electrode between said blocks.

2. In a battery, a plurality of porous nonconducting blocks, electrodes embedded in said blocks and consisting of parallel rows of cylinders, and an electrode between said blocks.

3. In a battery, a plurality of porous nonconducting blocks, electrodes embedded in said blocks and consisting of rows of separate parts, an electrode between said blocks, and spacing-strips in contact with the inner faces of said blocks.

In testimony whereof I have hereunto set my hand in presence of two subscribing witnesses.

PAUL CHAPUY.

Witnesses:
HENRY SCHWAB,
EDWARD P. MACLEAN.